E. A. LELAND.
HOSE-COUPLING.
No. 178,310.    Patented June 6, 1876.
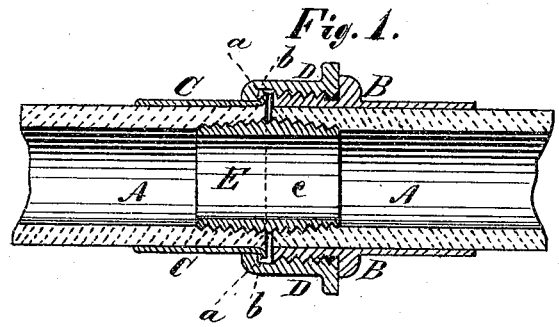
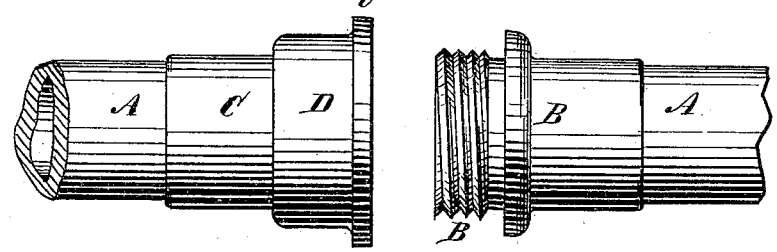
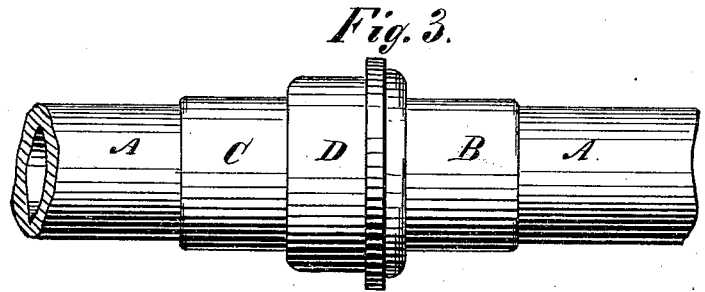
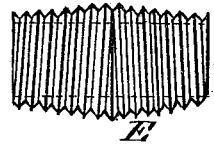    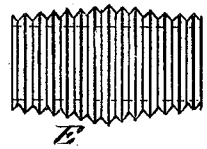
Witnesses:    Inventor:
Henry Eichling.    Edwin A. Leland
Edward Holly    per James A. Whitney
    Atty.

UNITED STATES PATENT OFFICE.

EDWIN A. LELAND, OF NEW YORK, ASSIGNOR TO LEONARD RICHARDSON, OF BROOKLYN, N. Y.

IMPROVEMENT IN HOSE-COUPLINGS.

Specification forming part of Letters Patent No. 178,310, dated June 6, 1876; application filed April 3, 1876.

*To all whom it may concern:*

Be it known that I, EDWIN A. LELAND, of the city, county, and State of New York, have invented an Improvement in Hose-Couplings, of which the following is a specification:

This invention is designed for coupling lengths of hose or flexible pipe made of india-rubber or other soft or yielding material; and it comprises a screw-threaded or circumferentially corrugated internal thimble arranged within the contiguous ends of the lengths of hose to be joined and used in connection with the two sections, and an annular sleeve or washer of a pipe-coupling, in such manner that the ends of the hose are firmly griped and compressed between the aforesaid thimble on the one side and the coupling sections and sleeve on the other, the threaded or corrugated surface of the thimble effectually preventing the longitudinal slipping of the sections of hose, and thereby insuring their firm retention at the joint.

Figure 1 is a central longitudinal section of a hose-coupling made according to my invention. Fig. 2 is a side view of the same, showing the parts separate or detached. Fig. 3 is a side view of the same, showing the parts joined. Fig. 4 is a detached view of the internal thimble as constructed with screw-threads, and Fig. 5 is a like view of the said thimble as constructed with simple circumferential corrugations.

At A are indicated the lengths or sections of hose to be joined. On the end of one of these is slipped the part or section B of a screw-coupling. On the end of the other is placed the sleeve or tubular washer C, the inner end of which is flanged, as shown at *a*, said flange resting upon the shoulder *b* of the part or section D of the aforesaid screw-coupling. This arrangement of the section D with reference to the sleeve C permits the turning of the section D in screwing the same upon the section B, as more plainly shown in Fig. 1. E is a metallic thimble, the bore *c* of which may correspond in a greater or less degree with that of the hose A. This thimble E tapers from the center toward each end, as represented in Figs. 1, 4, and 5, and is provided with circumferential alternating grooves and ridges, (shown in Fig. 1 aforesaid,) and which may form either a screw-thread upon each of the two tapering portions of the thimble, as represented in Fig. 4, or which may form simply a system of circumferential ribs or corrugations, as shown in Fig. 5. The thimble is inserted one-half in the end of one of the hose-sections A, and the other in the end of the other hose-section A, the diameter of the thimble being such that the insertion of the latter, as just set forth, radially expands or spreads the ends of the hose-section A aforesaid. The parts B and D and the sleeve C, hereinbefore set forth, are then brought into the position represented in Figs. 1 and 3, the part D being screwed upon the part B. It will be seen that the part B is brought clear to the end of one of the hose-sections A, and that the sleeve C is brought clear to the end of the other of the hose-sections A, the part B and the sleeve C being brought with their inner ends close to each other by the screwing of the part D upon the part B, as hereinbefore explained. This compresses the ends of the hose-sections A between the thimble E within, and the parts B and D and sleeve C without, the threaded or corrugated surface of the thimble E being forced firmly into the compressed ends of the hose-sections, so that the said hose-sections are firmly joined and held together.

What I claim as my invention is—

The externally threaded or corrugated thimble E, in combination with the parts B and D and sleeve C, and the ends of the hose-sections A, the whole constructed, combined, and arranged for operation substantially as and for the purpose herein set forth.

EDWIN A. LELAND.

Witnesses:
EDWARD HOLLY,
H. WELLS, Jr.